(12) United States Patent
Zador

(10) Patent No.: US 9,143,706 B2
(45) Date of Patent: Sep. 22, 2015

(54) IMAGING SYSTEM UTILIZING SPATIAL IMAGE OSCILLATION

(76) Inventor: Andrew Zador, Kitchener (CA)

( * ) Notice: Subject to any disclaimer, the term of this patent is extended or adjusted under 35 U.S.C. 154(b) by 974 days.

(21) Appl. No.: 12/563,878

(22) Filed: Sep. 21, 2009

(65) Prior Publication Data

US 2010/0135591 A1    Jun. 3, 2010

Related U.S. Application Data

(63) Continuation-in-part of application No. 10/730,189, filed on Dec. 5, 2003, now Pat. No. 7,609,318, which is a continuation-in-part of application No. PCT/CA02/00886, filed on Jun. 6, 2002.

(30) Foreign Application Priority Data

Jun. 6, 2001    (CA) ...................................... 2349828

(51) Int. Cl.
*H04N 5/357*    (2011.01)
*G06T 1/00*    (2006.01)
*H04N 5/349*    (2011.01)

(52) U.S. Cl.
CPC .............. *H04N 5/357* (2013.01); *G06T 1/0007* (2013.01); *H04N 5/349* (2013.01)

(58) Field of Classification Search
CPC ....... H04N 5/357; H04N 5/349; G06T 1/0007
USPC .................................................. 348/351–356
See application file for complete search history.

(56) References Cited

U.S. PATENT DOCUMENTS

| | | | | |
|---|---|---|---|---|
| 6,766,156 | B1 * | 7/2004 | Hayashihara | ................. 455/295 |
| 7,609,318 | B2 * | 10/2009 | Zador | ......................... 348/351 |
| 2002/0060686 | A1 * | 5/2002 | Matsumoto et al. | .......... 345/582 |
| 2003/0011717 | A1 * | 1/2003 | McConica | .................... 348/699 |

* cited by examiner

*Primary Examiner* — Mekonnen Dagnew
(74) *Attorney, Agent, or Firm* — Gowling Lafleur Henderson LLP

(57) ABSTRACT

An imaging system includes an image detector for producing a continuous image signal from an image received thereat; oscillation means coupled to the image detector for inducing a spatial oscillation in the image relative to the image detector; and a spatio-temporally matching filter in communication with the image detector and the oscillation means. The matching filter is configured to filter out aspects of the image signal not associated with the induced oscillation, to thereby provide enhanced image processing of the image.

35 Claims, 10 Drawing Sheets

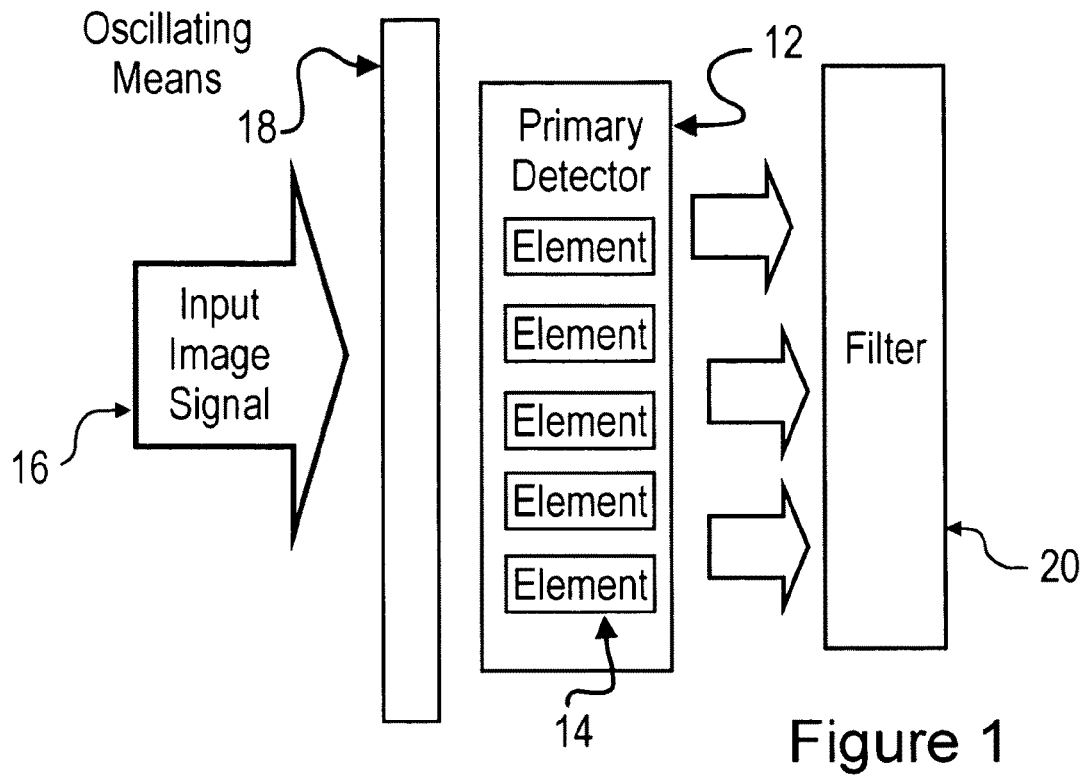
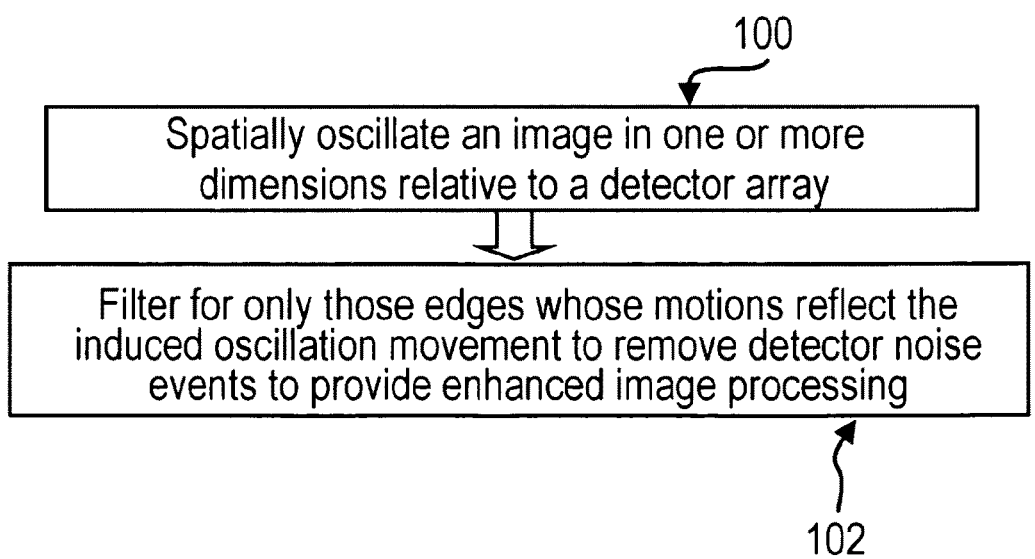
Figure 1
Figure 2

Noise rejection by opposed-polarity spatially coincident opponent center-surround detectors.

A) No input illumination. Noise from primary detector in on-center.

B) As above with time-random noise in primary or opponent detectors.

C) Centers illuminated. Time-correlated input from both opponents.

The classical linear chirp function increases frequency linearly with time, and is a constant-amplitude sinusoid.

The ideal exponential chirp function increases frequency exponentially with time, and is also a constant-amplitude sinusoid.

IMAGING SYSTEM UTILIZING SPATIAL IMAGE OSCILLATION

RELATED APPLICATIONS

This patent application is a continuation-in-part of U.S. Patent Application US 20040135898, entitled "Imaging System Utilizing Spatial Image Oscillation", filed Dec. 5, 2003, and claims the benefit of the filing date of Canadian Patent Application 2,349,828, entitled "Method, Apparatus, and System for Extracting Denoised, High-Resolution Images, Texture, and Velocity from a Lower-Resolution, Noisy Detector", filed Jun. 6, 2001. International patent application PCTICA02100886 was published, in the English language, in publication document WO 021099745 A2, on Dec. 12, 2002.

FIELD OF THE INVENTION

The present invention relates generally to imaging systems and methods, and more particularly to an electronic vision system that obtains high-resolution calibrated, de-noised images and velocities from a lower-resolution detector.

BACKGROUND OF THE INVENTION

The extraction of real-time velocity and noise-free detail from time-blurred frames of video has been inherently inaccurate. The problem is that current image detection technology is based upon raster, frame-at-a-time, or arrays of independent pixels for scene capture using light (x-ray, ultraviolet, infrared or other medium) integrating pixels. This process is limited in resolution by the number of pixels and their dimensions, and cannot avoid integrating noise into the detection process. Additionally, events occurring between frame captures are lost, and events occurring during exposures are blurred. Accordingly, attempts have been made to devise improved image detection and processing mechanisms with attention to mammalian visual systems. Since Mead and Mahowald first modeled human vision in silicon "retinas" in the mid 1970s, there have been many implementations to mimic the processing and functionality of retinal neural structures (e.g. Boahen, Delbrück, Koch, and VanRullen to name a few). Almost all of these implementations have treated the detection process as passive integration with gain control. A few (e.g. Prokopowicz, Landolt) have proposed using detector motion to enhance resolution or contrast, primarily to account for the fact that vision requires the image to move or else the scene fades away. These designs have not considered motion as a closed-loop de-noiser, tracker, and dynamic range extender. They have also not addressed the necessity of real-time continuous array element calibration, required for such a system to function, or the need to stabilize the image in any scene-memory plane for useful processing. In Landolt's design, there is no communication between pixels in the array (required for de-noising and calibration), and the nature of his detector elements (each being an independent voltage-controlled oscillator) acts as a noise source, masking real scene events.

For instance, J. C. Gillette ("Aliasing Reduction in Staring Infrared Imagers Utilizing SubPixel Techniques") describes a method of uncontrolled micro-scanning for reducing aliased signal energy in a sequence of temporal image frames obtained by periodically sampling an image with a finite array of image detectors. Gillette takes a series of discrete low resolution samples of an image at a specified undersampling frequency, while "spatially oscillating" (actually just shifting) the detector between samples, thereby providing a sequence of static image frames, each having a subpixel offset relative to one another. By comparing the gray-scale values of successive image frames, for each image frame an estimate is calculated of each subpixel shift that occurs between successive image frames. Each image frame in the image sequence is then mapped onto a higher resolution grid, based on the respective estimated interframe displacement. If the estimated shift is the same for multiple frames, then the pixel values at the overlapping positions are averaged to suppress noise.

Since Gillette only calculates an estimate of the subpixel shifts, Gillette is unable to determine the portion of the magnitude of the pixel values actually attributable to the subpixel shifts. Estimation errors in subpixel shifts result in blurring and additional scene noise. This problem is compounded by the fact that Gillette averages the values of the pixels in successive frames that have the same estimated subpixel shift, thereby precluding removal of those aspects of the image frames not attributable to the subpixel shift. As such, the high resolution grid would include pixels whose values are not attributable to the subpixel shifts (e.g. resulted from detector noise).

Further, Gillette must estimate the subpixel shift in each frame, resulting in multiple frame delays for one high-resolution image. Also, the frame basis of the method, and the corresponding finite exposure times, result in motion blur in each frame as objects traverse the scene. Additionally, given the discrete sampling nature of the method, aliasing in time is possible if the sampling frequency is insufficient for the scene motion. Real motion in three dimensions in the scene also precludes actual high resolution frame registration as does block-matching which cannot take account of dense motion fields.

H. Ogmen ("Neural Network Architectures for Motion Perception and Elementary Motion Detection in the Fly Visual System") describes a neural network model of motion detection in the fly visual system. Ogmen uses center-surround opponency as the basis for both directional and non-directional motion detection, both in the center field-of-view and the periphery. However, Ogmen only performs statistical neural filtering post-processing of the vision data, thereby integrating noise with the vision data, with the ultimate result of reduced signal detection.

For the foregoing reasons, there is a need for an improved electronic imaging system.

Several current technical papers handle the complexities of a dense retinomorphic detector array design required as a component of the present system. To avoid missing pixel-crossing events it is necessary to store events at each pixel (or equivalently at a memory address corresponding to the pixel or center of a center/surround). Designs of Address Event Representation (AER) chips exist and can also be modified to include time-stamps on each event. With sufficient memory, each pixel may record several crossing events in AER mode asynchronously, and a column raster data collection architecture can collect the data from each location for processing at a suitably frequent rate, or whenever a local event buffer becomes full. Ideally such processing would be provided by a distributed array of processors performing standard detection and de-noising algorithms with each processor handling a region of the detector array. It would further be advantageous to permit detector overlap so that motion events in the scene may be seamlessly passed from one processor to the next. AER retinomorphic array design and intelligent sensor design articles describing systems capable of being adapted to our application include "Point-to-Point Connectivity Between Neuromorphic Chips using Address Events", Kwabena Boahen, IEEE Trans. On Circ. & Sys., Vol. 47, No. 5, 2000, "A Nyquist-Rate Pixel-Level ADC for CMOS Image Sensors", David X. D. Yang et al, IEEE Jour. of Solid State Circ., Vol. 34, No. 3, March 1999, "A Foveated AER Imager Chip", M. Azadmehr et al, University of Oslo, Norway, 2000, "Bump Circuits for Computing Similarity and Dissimilarity of Analog Voltages", T. Delbrück, California Institute of Technology Computation and Neural Systems Program, CNS Memo 26, May 24, 1993, and "A Spike Based Learning Rule and its Implementation in Analog Hardware", Ph.D. Thesis, ETH Zurich, Switzerland, 2000, P. Häfliger, http://www.ifi-.uio.no/~hafliger. The preceding articles are incorporated into the present application in their entirety by reference.

SUMMARY OF THE INVENTION

The present invention is directed to an imaging system and method utilizing spatial image oscillation to obtain enhanced image processing of a scene.

In one aspect of the present invention, the imaging system includes:

an image detector for producing a continuous image signal from an image received thereat;

oscillation means coupled to the image detector for inducing a spatial oscillation in the image relative to the image detector; and a spatio-temporally matching filter in communication with the image detector and the oscillation means for providing enhanced image processing of the image, the matching filter being configured to filter out aspects of the image signal not associated with the induced oscillation.

In another aspect of the present invention, the imaging system includes:

an image detector for producing a continuous image signal from an imager received thereat;

oscillation means coupled to the image detector for inducing a spatial oscillation in the image relative to the image detector; and a spatio-temporally matching filter in communication with the image detector and the oscillation means, the matching filter being configured to filter for aspects of the image signal (e.g. image edges) that correlate with the induced oscillation for providing enhanced image processing of the scene.

The terms "primary" and "secondary" as applied to detector arrays are hereinafter used to differentiate between the light-integrating first layer of detectors in the proposed system, and the second layer of opponent process detectors fed by the first layer. Their topology and function shall be described below.

In one implementation, the system includes a secondary array of opponent center/surround detectors grouped by spatial orientation to provide multiple evenly-spaced orientations in the plane of the primary array for receiving signal inputs at the center/surround detector's center (interpreted as either positive or negative depending upon the polarity of opponent surround being passed the illumination information), and receiving opposing input from primary detectors adjacent to a primary central detector, each center/surround detector fed by one or more detectors from the primary detector array, therein extracting improved contrast, velocity, and relative luminance change information.

In an aspect of the present invention, the method involves the steps of:

(i) providing a continuous image signal by spatially oscillating an image relative to an image detector, and (ii) with reference to the spatial oscillation, filtering out aspects of the image signal not correlated with the applied spatial oscillation.

In another aspect of the present invention, the method involves the steps of spatially oscillating an image in one or more dimensions relative to a detector array, and filtering for aspects of the signal (e.g. image edges) that are modulated by the induced oscillation. The dynamic matching of the filter would be phase-locked to the imposed oscillation means in real-time, such that any desired signature oscillation could be applied (e.g., to de-correlate (or alternatively to enhance) a specific feature having its own oscillation in the scene).

In one implementation, the spatial oscillation step is provided by a swept-frequency sinusoid chirp. Further, the method includes the step of receiving signal inputs at each center/surround detector's center (interpreted as either positive or negative depending upon the polarity of opponent surround being passed the illumination information), and receiving opposing input from primary detectors adjacent to a primary central detector, each center/surround detector fed by one or more detectors from the primary detector array, therein extracting improved contrast information to provide real-time spatial motion and velocity information.

The invention obtains a high-resolution, de-noised continuous-real-time image and component velocities, directly from a lower-resolution detector feeding contrast/motion-sensitive opponent center surround detectors, by removing spatio-temporal noise, and correcting for pixel-to-pixel differences due to differences in detector responses, both in DC offset and gamma variations. As well, the invention greatly reduces downstream computational load for intelligent vision applications, and since this is applied at the detector level, if no active transmission, or illumination are involved, it can be purely passive, and therefore stealthy.

The present invention relies on the ability to perform pixel-specific calibration of zero-offsets and gamma differences, and to perform noise de-correlation in real-time. It employs motion signature based matched filtering, and continuous event tracking at all locations in the secondary detector array, enabling increased spatial- and luminance-resolution, and low-light and low-contrast detection, which would otherwise be masked by mis-calibrated noise-polluted integrating pixels. The article "Continuous-Time Calibration of VLSI Sensors for Gain and Offset Variations", John G. Harris, University of Florida, SPIE Intl. Symp. On Aerosp. Sens. And Dual-Use Photonics: Smart Focal Plane Arrays and focal plane array testing, Vol. 2474, pgs. 23-33, Orlando, Fla., April 1995, is incorporated into the present document in its entirety by reference.

The hardware implementation of the present invention will require a retinomorphic vision chip front-end incorporating the opponent center/surround architecture or configurable to achieve it using Address-Event Representation (AER) architecture, modified to include time-stamped crossing events. Candidates include Boahen's, Azadmehr's and Delbrück's AER chip designs, cited above Azadmehr's design allows for recording of the luminance value at each location in addition to the contrast value.

The hardware implementation will further require an optical beam deflector (for the case of light) to serve as the oscillation source. There are several current commercial sources of acceptable beam deflectors with adequate speed, positional and temporal accuracy, for both the reflection and transmission modes of operation.

The analogy of the mechanical oscillation process used in our signal processing to the chirp mode used in radar is illustrative for analysis of the advantages over simple pixel crossing detection. A White Paper describing the connection is included in the present document by reference: "Differentially Detected Oscillated Imaging Relationship to Radar Signal Processing", Fovix Corporation Internal Document, May, 2001.

An analysis of the advantage of using a spatio-temporal signature to extract weak scene information in noise is also illustrative of the advantages of the present invention, over simple pixel crossing detection. A White Paper analyzing scene extraction in detector noise is also included in the present document by reference: "Analysis of Matched Filtering Applied to Opponent-Surround Based Object-Edge Detection in Noise", Fovix Corporation Internal Document, Dr. Vadim M. Kustov Ph.D., February 2001.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

These and other features, aspects, and advantages of the present invention will become better understood with regard to the following description, appended claims, and accompanying drawings where:

FIG. 1 is an overview of a vision system utilizing spatial oscillation in accordance with the present invention. A scene (16) is imaged being oscillated in a controlled manner by an oscillation means (18) upon a staring array (12) of detector elements (14). Motion filtering matching the applied oscillation using a motion filter (20);

FIG. 2 is an overview of a vision method utilizing spatial oscillation in accordance with the present invention. Applied oscillation upon the image relative to the detector array (100) is matched by filtering (102) to detect scene elements matching the motion, and to reject noise;

FIG. 9 is one example of the secondary array, and other installations are possible by reading the specification as a whole;

DETAILED DESCRIPTION OF THE PRESENTLY PREFERRED EMBODIMENT

Figure 3:
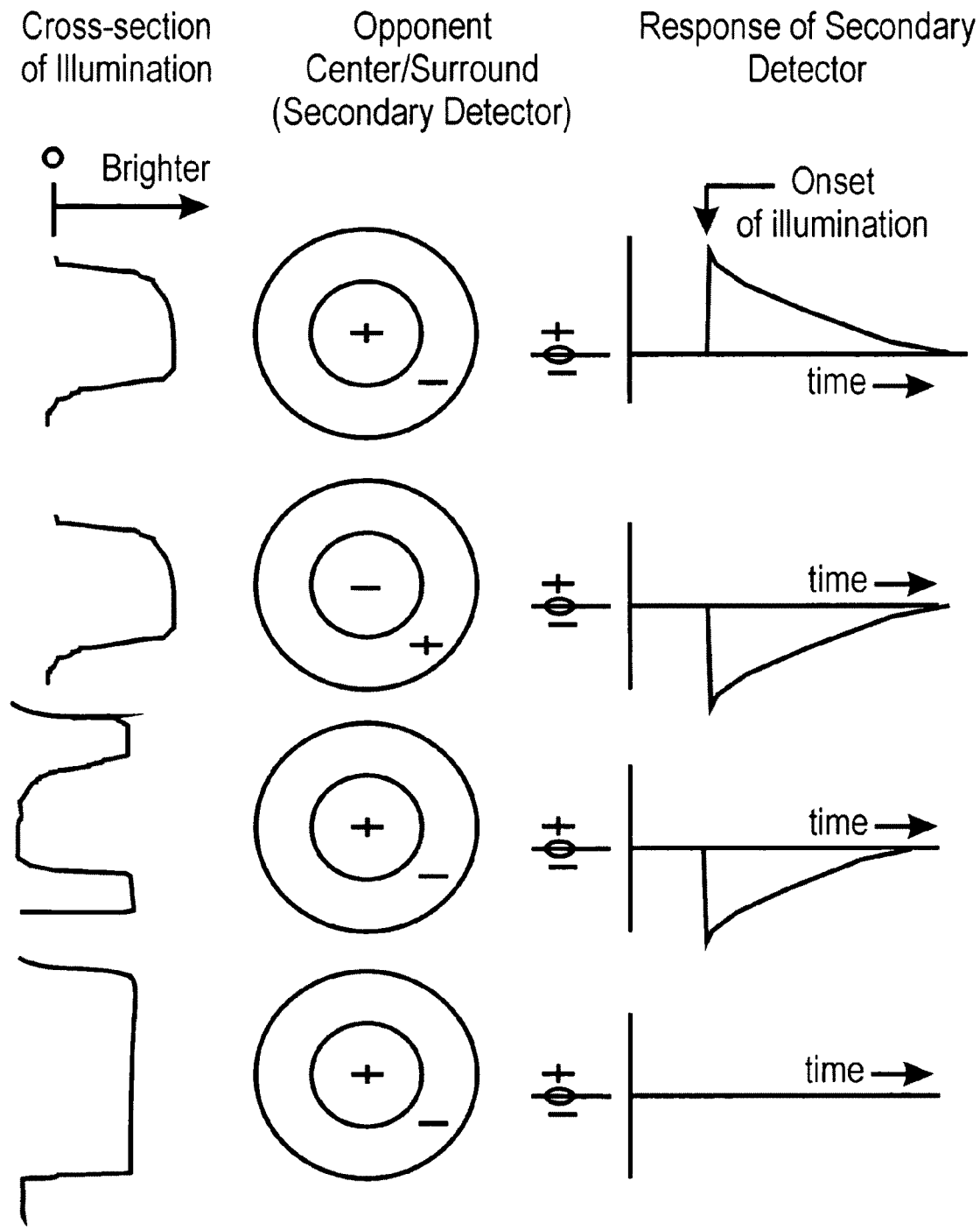
FIG. 3 illustrates various proposed brief spatial illuminations of opponent center/surround structures with resulting temporal output responses.

The present invention is directed to a vision system, method and apparatus utilizing spatial oscillation. As illustrated in FIG. 1, the system includes a primary detector array 12 having detector elements 14 sensitive to an input image signal 16, means 18 for inducing a spatial oscillation in the image 16 relative to the primary detector array 12, and a filter 20 for filtering the image signal according to the spatio-temporal motion signature of the induced oscillation so as to extract those elements whose motions reflect the induced oscillation, therein removing noise events to provide enhanced image quality and simplified post-processing. In a preferred embodiment, the AER retinomorphic architecture is that of Azadmehr (see citation above). For specific applications (e.g. infrared) the primary array may be bump bonded (see Delbrück citation above) to Azadmehr's AER chip using suitable materials (e.g. indium antimonide).

In a preferred embodiment of the present invention, the induced oscillation means 18 is provided by for example a swept-frequency sinusoid chirp and is capable of arbitrary oscillation under program control. In a preferred embodiment of the present invention, the system further includes a secondary array 24 of opponent center/surround detectors 26 grouped by spatial orientation to provide multiple evenly-spaced orientations in the primary array 12 for receiving either positive or negative signal inputs at the center/surround detector's center, and receiving opposing input from primary detectors adjacent to a primary central detector, each center/surround detector fed by one or more detectors from the primary detector array, therein extracting improved de-noised, calibrated, contrast information and improved real-time spatial and velocity information.

As illustrated in FIG. 2, the method includes the steps of spatially oscillating an image in one or more dimensions relative to a detector array 100, and filtering for only those edges whose motions reflect the induced oscillation movement, to remove detector noise events to provide enhanced image quality and simplified downstream processing 102.

The oscillation of the image upon the detector may be accomplished in any one of several ways. It can be achieved by a piezo-controlled two-axis mirror in a folded optical path, by a pair of controllable index orthogonal optical wedges (see U.S. Pat. No. 6,034,811, Dr. George Seaver), or a shift lens in a straight-through optical path, or even by a nano-positioner on each axis of the detector array, with the oscillation under programmable control. As will be apparent, if wide flat spectral bandwidth is critical then a mirror would be the preferable embodiment, while straight-through optics would be simpler, smaller and usually lighter to implement. Several patents exist describing opto-mechanical image-steadying applications in hand-held cameras that could be applied to the image oscillation process. Filtering in this system is performed by a spatio-temporal filter for auto-correlating motions on the detector of real objects in the scene modulated by specific arbitrary applied oscillations in real-time of the image upon the array; the filtering extracts features whose motions are a product of the induced oscillations (or the induced oscillations modulating the real proper motion of the object), but treats spatio-temporally decorrelated activity as noise. Filtering for motions matching the oscillation may be accomplished by any one of several means. Opponent center/surround detector crossings by elements in the image may be selected if they match the instantaneous orientation and velocity of the current action of the oscillation anywhere in the scene. In a two-dimensional oscillation (e.g. a "figure-8" at 1 Hz) viewing a dim scene with detector noise, scene elements acting with the matching motion and phase would stand out statistically along the oscillation path whereas they would appear as indistinguishable static noise on a motion-less detector. In a preferred embodiment the oscillation would be performed either by a piezo-actuated mirror in the optical path or by nano-actuators on the detector array, while filtering would be accomplished by a parallel array of processors connected to the secondary array's continuous output, each analyzing a small area of the image. The contrast-view of the secondary array simplifies the scene by highlighting the edges of scene objects which are easier to track than luminance based scenes, and prevents saturation of areas of the scene when the combined array output is directly wired to indicate contrast.

In an embodiment of the present invention, the method further includes the step of receiving either positive or negative interpreted signal inputs at each center/surround detector's center, and receiving opposing input from primary detectors adjacent to a primary central detector, each center/surround detector being fed by one or more detectors from the primary detector array, therein extracting improved de-noised, calibrated, contrast information and real-time, increased accuracy spatial and velocity information 106.

Spatially coincident opponent center/surround structures fed by the primary detector array are employed to remove spatio-temporally random detector-noise events. Spatially oscillating the image with respect to the detector, filtering only for those edges whose motions reflect purely the induced oscillation, and obtaining accurate phase information at edge-crossings accurately locates static edges resulting in super-resolution. Spatio-temporal activity not suitably matching the space-time characteristics of the oscillation, or a Doppler shifted version of it, can be treated as noise. The texture isolation (discussed below), edge-motion detection, and noise removal processes rely on principles deduced from mammalian vision.

In order to visualize how the size of the detector pixels can be made irrelevant in detecting objects smaller than one pixel, one can imagine a circular optical detector divided into four detecting quadrants and illuminated with a spot of light falling entirely on the detector area. If the four quadrants are compared in pairs (for all pairs) by determining ratios of energies falling on both quadrants in each pair, then the position of the centroid of the illuminating spot can be known accurately limited only by the accuracy of the comparator and not by the size of a quadrant or the entire detector, which could be arbitrarily large. Given the self-calibration capability of adjacent pixels of a detector used in this manner, the timing of edge crossings can provide substantially improved spatial and exposure resolution when compared with the resolution that pixel dimension and bit-depth alone can provide. Spacings between detectors can give rise to hysteretic response depending upon the direction of crossing (analogous to backlash in a mechanical system), but neural logic can bisect such hysteresis giving true centroid crossing timings.

The proposed system may be applied to scene analysis such as texture and pattern segmentation. In the envisioned system oscillating an opponent center/surround array at various orientations over an image is proposed as an efficient method of identifying texture and pattern regions, which may be rendered in real-time as false-color images of texture regions. All opponent center/surround detectors oscillating in parallel over similar textures or patterns would produce similar edge-crossing outputs whose frequency content would spectrally match independent of the local luminance or scaling. This mechanism is proposed as useful to identify large regions of similar texture and boundaries between textures in a massively parallel manner. For a particular orientation of oscillation of an image upon a detector, center/surround crossings by various single slices of texture in a particular direction at a given speed or acceleration will yield a specific frequency spectrum of edge-crossing bursts, dependent upon the spacings and contrast-amplitudes within the texture slice and the frequency, or frequencies in the case of a chirp, of the generated oscillation. It should be noted that since the contrast contours of the texture can be determined to a higher spatial accuracy at the detector array by using oscillation than individual primary detector size alone would indicate, substantially more accurate high-frequency information is available for texture discrimination than would be present from scanning a standard static bitmap of that same image. Any center/surround crossing a texture boundary would experience a sudden change in spectrum, locating the boundary accurately.

In an embodiment of the present invention, a chirp in one or more dimensions can be put to particular use as the induced oscillation, since any object in motion across the field of view of the imaging array during the chirp will yield a Doppler shift with higher SNR, giving potentially more accurate velocity information. For example, a camera employing this method will only update "just-noticeable-difference" (JND) or greater moving edges, and do so instantaneously as they move, since motion of edges across opponent center/surround detectors provides an immediate response signal, and static objects can be optionally ignored after an oscillation has stopped, since they normally fade due to the memory time constant of the primary detectors.

Utilizing Doppler techniques, accurate object velocities can be collected during oscillation by detecting the frequency shift with respect to the induced oscillation of objects crossing multiple opponent center/surround detectors, and noting the orientation of the sequence of crossings. For a particular orientation of oscillation, center/surround crossings by a slice of texture in that orientation will yield a specific frequency spectrum of edge-crossing bursts. Given more than one orientation and possibly different scales of such an oscillation, and grouping regions by their resulting oscillation spectra, texture regions can be efficiently isolated and identified. Textures, edges, and isolated points will have substantially different spectra useful for identification.

The detectors can be incorporated with any reasonable "memory" time constant, or, in a preferred embodiment, be programmed based upon local illumination upon each zone of the image on the array and be scene-object based down to the pixel. Such a system will have access to accurate real-time velocity data based upon direct measurements at the pixel level, eliminating the need to calculate inaccurate motion vector fields from sequential, time-blurred and possibly interlaced frames. Velocity information determined from local motion on the array can be predicted and fed-forward in a velocity memory layer co-located with a similarly fed-forward contrast memory, following the object, permitting detector integration times to be de-coupled from faint but real contrasts of possibly fast-moving objects. Currently, motion vector fields are computationally expensive and require a latency of at least one image frame delay plus computation time, rendering them unusable in high-speed real-time motion applications. Information about velocities determined from the differences between frames seen in existing systems can be seriously outdated by the time the data is available, even if such information were accurate for the period being calculated. Also intra-frame blur makes instantaneous location uncertain, and noise is irreversibly integrated with signal, which also adversely affects velocity determination. Post-processing can use intelligent methods to clean an image, but once noise and signal have mixed this is still a form of guessing.

In a preferred embodiment, moving the acquired image data in the memory layer below the secondary opponent center/surround layer to track the detected or predicted motions of scene objects can be used to demodulate the applied oscillations permitting simpler scene analysis. This can further be used to track true, continuous object motions in the scene, and can also be employed to stabilize the image relative to either the world-view or relative to any single moving object in the scene. Given secondary memory areas with access to the same oscillation and motion information, multiple objects with differing motions may be stabilized and tracked simultaneously regardless of the applied oscillation or underlying camera motion. These uninterrupted and stabilized real-time views tracked independently on a staring array have wide-ranging applications from sport goal-judging to accurate object tracking and collision avoidance/interception and robotics.

The invention's primary detector array will typically be monochrome for most applications, but can easily be extended to color, hyperspectral or non-light applications such as ultrasound. Each of the linear (symmetric) opponent center/surrounds of the secondary array of detectors are fed by at least three primary luminance detectors, which upon exposure to illumination of the primary detectors feeding it, will output a fast-rise-time pulse followed by a decaying analog level. This analog level will be proportional to either the luminance difference or the log of the luminance difference depending upon the application, between the center of the opponent center/surround detector and its surround.

This level will have a characteristic polarity depending upon whether the opponent detector was on-center or off-center, while the surround will be opponent to either variant of center. Further, the level will have a time-constant, decaying after initial exposure, and will also possess a turn-on threshold that could be interpreted as a Just Noticeable Difference (JND), between the center and its surround. This threshold can be fixed or tuned in real-time to imitate human sensitivity, or any desired application-specific sensitivity. The JND can in fact refer to any achievable or required difference sensitivity for a particular task, detection system, or image medium. Multiple opponent center/surround detectors of the same polarity chained in a specific orientation, and exposed to a moving luminance edge will output a train of pulses directly related to the apparent velocity of the edge, and superimposed on the contrast level signal representative of the exact times of successive center/surround crossings.

During static periods, such as between induced oscillations, objects undergoing real motion detectable in the plane of the array can be selectively given attention by temporarily suppressing those detectors having detected stationary edges during the previous oscillation, greatly reducing the computational load on robotic vision systems.

In a preferred embodiment of the present invention, for the luminance case extendable to color channels and any other form of signal, the array is oscillated under the source such that each pixel in the array gets to see each source point over some given radius. Given a fixed offset error at each primary detector, and (for a sufficiently fast system) a static set of illumination values in the field of view being sampled by the detectors, the resulting set of sampled values constitute a set of >N equations in N unknowns, where the unknowns are the offsets. Given a small spatial sample for each detector such that the local luminance variation is probably small, the offset could even be a luminance-varying gamma curve, since over a small luminance variation the offset would still be a fixed value. Thus, the systematic relative differences between adjacent detectors could be determined, and the pixels calibrated against their neighbors by adjustable weightings to the opponent layer to provide real-time, ambient illumination detector self-calibration. In a preferred embodiment the array calibration process described in "Continuous-Time Calibration of VLSI Sensors for Gain and Offset Variations", John G. Harris, (see citation above) may be incorporated into the present design.

Figure 4:
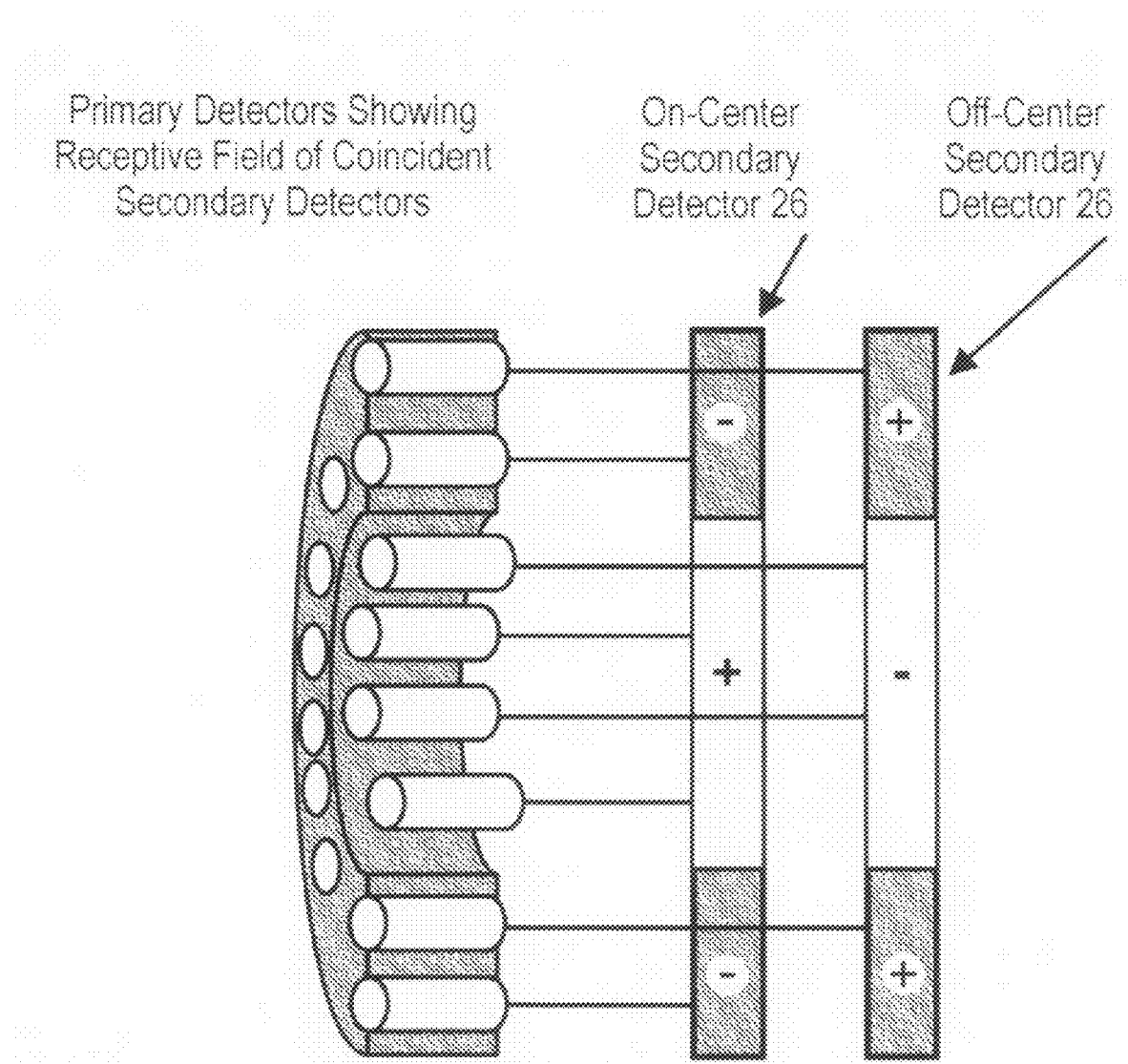
FIG. 4 illustrates several primary detectors arranged in a concentric ring and central circle, connected to one secondary opponent center/surround (26), interleaved with other primary detectors from the same ring and circle connected to an opposite polarity center/surround, showing the manner in which a dual differential response may be derived from a spatial array of primary (inherently mono-polar) detectors.

As illustrated in FIGS. 3 and 4, an image is provided by a two-dimensional image detector array having an image focused upon it. The image is analyzed as a differential image in an opponent center/surround structure having multiple imaging pixels connected by logic circuits similar to structures and processes found in the human retina. Any luminance edge within the image crossing such an opponent center/surround detector will trigger a motion detection event or impulse at the instant that the centroid of an edge passes over the center of such a structure, along with a decaying level representing the instantaneous contrast between the center and its surround.

Figure 5:
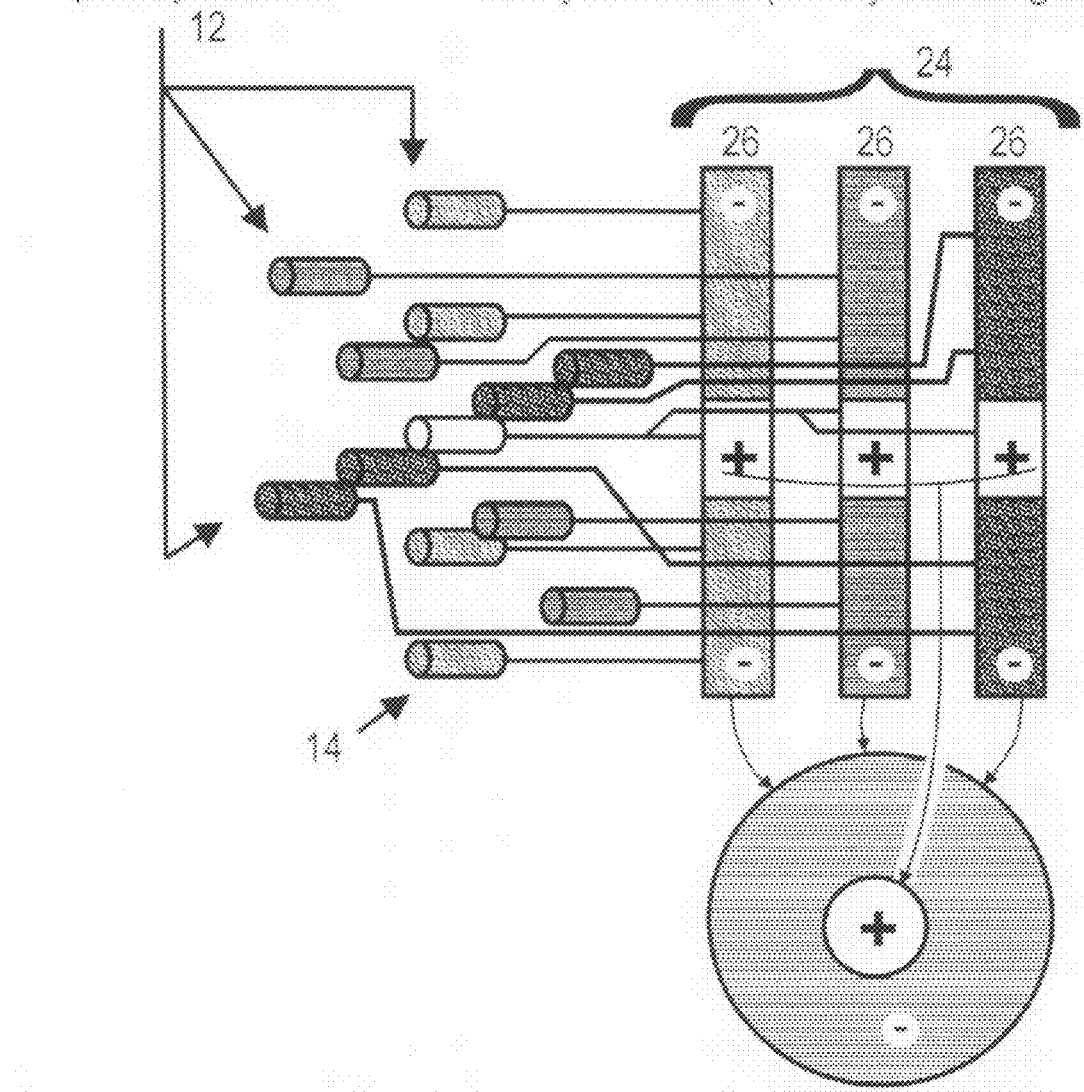
FIG. 5 illustrates primary detectors providing input to three orientations of linear-geometry opponent center/surround cells. In this figure, the center/surrounds all have identical on-center off-surround polarity.

In a preferred embodiment of the present invention as illustrated in FIG. 5, the detectors circularly symmetric center/surrounds are composed of various orientations of rows of pixels connected as linear center/surrounds, contributing separately to the concentric circular opponent structure; similar to the ocular dominance column mechanisms in human vision. This will yield orientations of edges and directions of motions (assuming overlapping center/surrounds yielding quadrature signals for a motion). The attainable timing accuracy of the centroid of a spot crossing over an opponent center/surround detector will primarily determine the achievable "resolution" of the edge, and not the array's pixel size or the center or surround sizes of an opponent center/surround structure.

If every edge that crosses such a detector is subsequently displayed with the exact relative timing of its crossing, then the perceived spatial resolution will be much higher than that viewed on a raster scan display of the same physical resolution. Alternatively, the implied finer path knowledge of the moving edge can be displayed as a temporal sequence of finer pixel crossing events on a higher-resolution display. This additional temporal knowledge at edges will yield higher spatial resolution information than would be indicated purely by the detector's pixel size, enabling the use of larger pixels at the detector to integrate more signal, and thereby yielding a higher signal-to-noise ratio (SNR) at a given exposure.

In an embodiment of the present invention, since the image is viewed as a differential luminance map at the secondary opponent layer of the detector system, if the imaging array border is covered by reference-black then all luminance, and similarly colors, can be coded as spatially accumulated differences from the surrounding black reference across several center/surround detectors, or several scales of center/surround detector. This becomes crucial in the human eye where there is no clear evidence of a low-pass version of the image for calibrating color and luminance, as is available in a wavelet pyramid.

Figure 6:
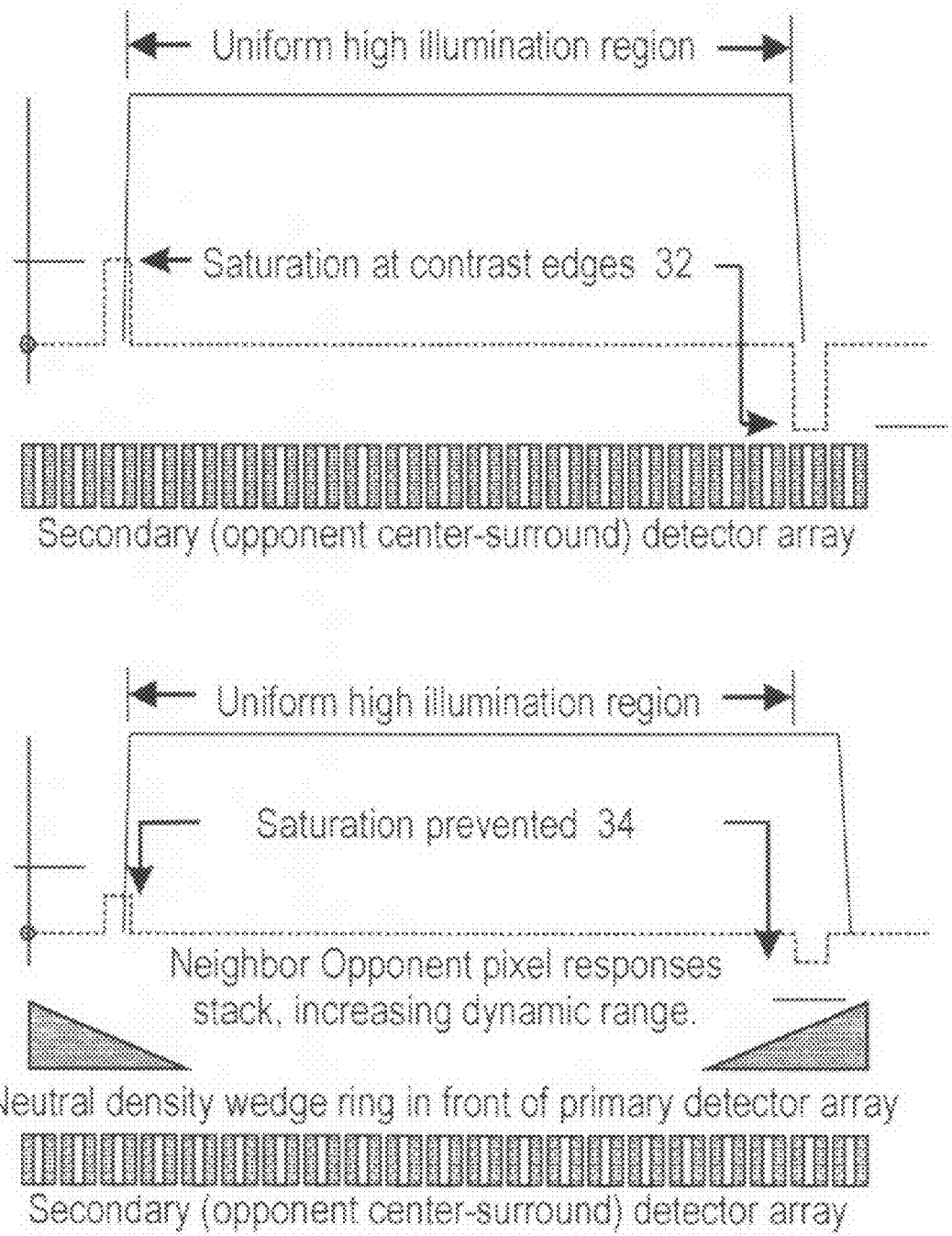
FIG. 6 illustrates a graded neutral density wedge covering the edge of a detector array, facilitating greater dynamic range (effective bit-depth) of the system. Without such a wedge, high-contrast edges in the scene can saturate the secondary opponent array elements (32). Using the wedge and calibrating referenced to black at the edge of the detector array can prevent such saturation (34)

In an embodiment of the present invention as illustrated in FIG. 6, a known neutral density wedge fading to reference-black is used to aid in allowing a gradual brightening near the edge of the field of view of the detector toward the center even in a uniformly bright field, permitting adjacent opponent center/surrounds near the edge to report differences kept within the range of each of the individual center/surrounds. In a multi-resolution structure such as a wavelet pyramid, this permits a higher dynamic range than any individual opponent center/surround cell is capable of providing due to the successive approximation nature of the increasingly finer scales. Equivalently, the local JND threshold at each center/surround can be spatially and temporally varied to prevent saturation or under-illumination (recording the threshold to compensate at the output), or to reflect the characteristics of human vision, or to reduce information content in low light, high contrast, or high texture for uses such as reducing the computational load on any subsequent intelligent vision system.

Ignoring texture, most slowly varying luminances in naturally illuminated scenes can be described by JND contours, which are only one bit deep by definition, similar to isobars on weather maps. Therefore, the dynamic range of each individual pixel does not have to be great in a multi-resolution opponent center/surround structure. This is particularly the case if each pixel's sensitivity is logarithmic. These may be the underlying structures in biological vision where the total dynamic range is huge, while the sensitivity to tiny adjacent differences is simultaneously high; yet individual neural detector "bit-depths" must be too small to accurately cover the entire dynamic range of the visual system.

Figure 7:
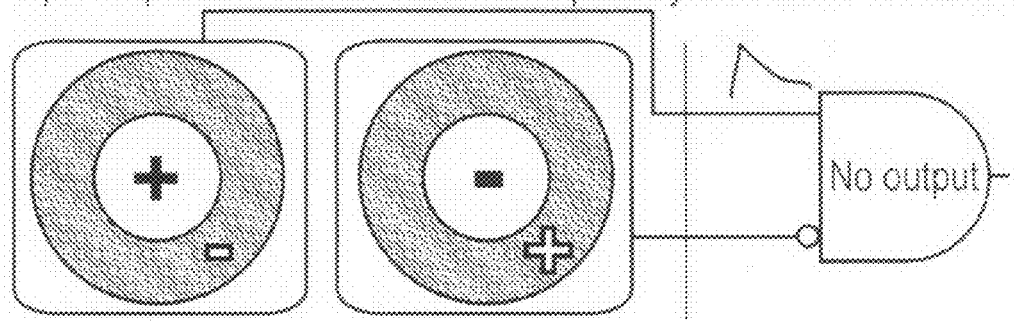
FIG. 7 illustrates 3 examples of spatially coincident opposite-polarity center/surrounds, and their role in canceling detector noise.
Figure 7:
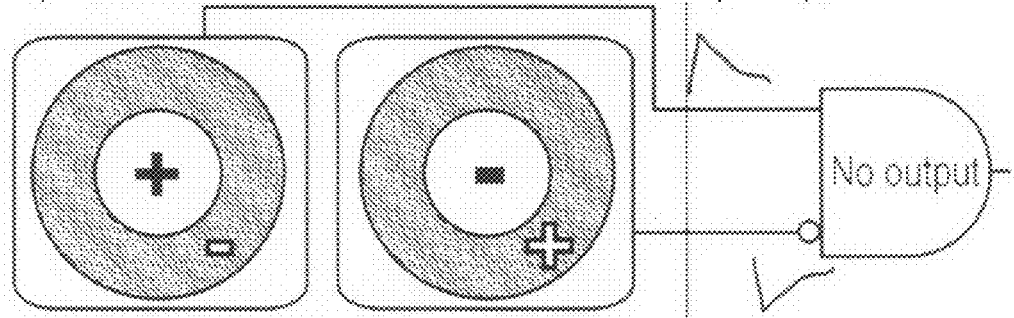
Figure 7:
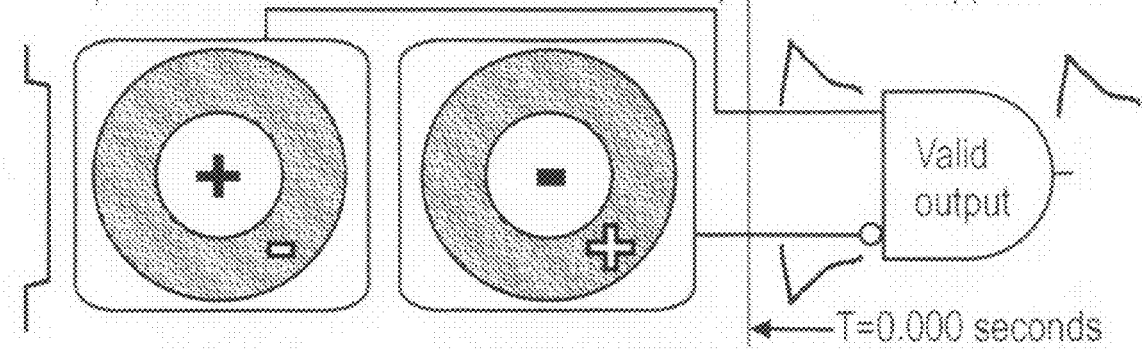

If dual-polarity pairs of opponent center/surrounds are used to cover the same spatial location, again reflecting similar human retinal structures, an edge traversing an on-center/off-surround will cause a positive impulse, while the same event simultaneously detected in an off-center/on-surround will be indicated by a negative impulse. As illustrated in FIG. 7, if on-centers poll a small population of pixels in a small spatial cluster, and off-centers poll a different small population of pixels spatially centered in the same cluster, with surrounds sampled analogously from an annulus of pixels around the central cluster, a single noise event at a given instant in any pixel contributing to a center or its surround will unlikely correlate to any simultaneous single pixel noise event contributing to a center or surround of the opposite polarity at the same location. Such a dual-detection process will cancel out most detector noise events due to the lack of a simultaneous response from the spatially coincident, opposite-sign opponent center/surround. It will also confer immunity to direct current (DC) level changes analogous to common mode rejection in a differential amplifier.

In an embodiment of the present invention, the oscillation path can be precisely determined by employing a reference illumination spot aimed at a sample point within the detector, and subsequently feeding back the exact measured nature of the oscillation. Detector noise and fast time-varying image noise will have an extremely small probability of passing through such a filter. Also, luminance variations, which are seen to be a systematic function of pixel location on the detector (known as "fixed pattern noise", although it may be luminance-dependent) via use of the oscillation, can be nulled thus calibrating all the primary detectors relative to their neighbors. This is suspected of being another purpose for micro-saccadic motions seen in the human eye.

Between oscillations, any real motion of an edge along a specific orientation of several center/surround detectors will cause a series of centroid crossover events that can be directly interpreted from the detector as a velocity in much the same way that a child dragging a stick along a picket fence will indicate speed information by the frequency of the stick rattling along the fence. Since the detector reports every center/surround crossing event, there is no missing motion data and therefore velocity and motion vector fields can be reported precisely.

In an embodiment of the present invention, if the opponent detectors indicating the latest positions of static edges found during the oscillation phase are suppressed between oscillations (by the detector memory time constant) the system can be made very sensitive to anything possessing real motion, since only these detectors will report motion during the periods between oscillations. In any intelligent vision application the isolation of known moving targets and the identification of their velocities are critical time-consuming tasks, which this detector structure can perform efficiently and accurately with little processor burden.

Groups of these detectors in the array can be further chained in a multi-resolution structure with different orientations separately chained.

As stated previously, the oscillation can be used in different orientations of the image to extract multiple directions of one-dimensional, high-resolution texture spectra over different lengths of opponent center/surround detectors at a given coarser scale for rough identification of similar texture areas. A coarse scan can group textures using a crude spectral comparison for purposes of locating approximate borders between different textures. Then, concentrating along these approximate borders, a higher-resolution texture-difference scan can be made using more sensitive criteria. This process avoids massive iterations or computationally prohibitive filtering, while permitting spatially accurate texture edges to be mapped. These texture spectra are derived from "pulse trains" generated by the chained opponent center/surround detectors having the textures oscillated over them, and will reflect their spatial resolution. By using a multi-resolution center/surround structure starting with a coarser scale, regions can be grouped by similarity, then at a finer scale near texture-difference borders previously derived from the coarse scale examination, exact texture borders can be determined using less on-chip processing. Thus, similar texture regions can be efficiently isolated and, given a suitable look-up table or other known methods, textures identified.

Scaling is logical since an arbitrary sample set of primary detectors can be used for a particular center and/or surround, and several different scales can, in principle, use any one detector variously as center or surround and as on-type or off-type. Scale can be employed to gather more light as above, and to verify an event in a region by its appearance at different scales in the same locale. In this case the selection of primary detectors being sampled is important, since it may produce an unwanted self-fulfilling prophecy by measuring an event at multiple scales using the same, possibly noisy pixel as evidence at various scales. Assuming judicious pixel selection for each scale at a given location, evidence of motion at a coarse scale with sufficient illumination can be used to adjust integration times and gains of pixels reporting to a finer scale, in order to facilitate extracting more detailed motion information.

These logical scales can apply to various lengths and orientations of lines acting as opponent surrounds. This can be used to predict direction and velocity of objects crossing the field of view at various speeds. So, if one wants more velocity accuracy, then the firing rate of chained short lines being crossed is better. If sensitivity to a low contrast edge moving is important, then summing perpendicular to direction of motion will be useful. Thus, steered shape opponent-surrounds can be created to extract faint edges, and by spatially steering these shapes one can maximize the sensitivity to the direction and velocity of a specific stimulus.

Figure 8:
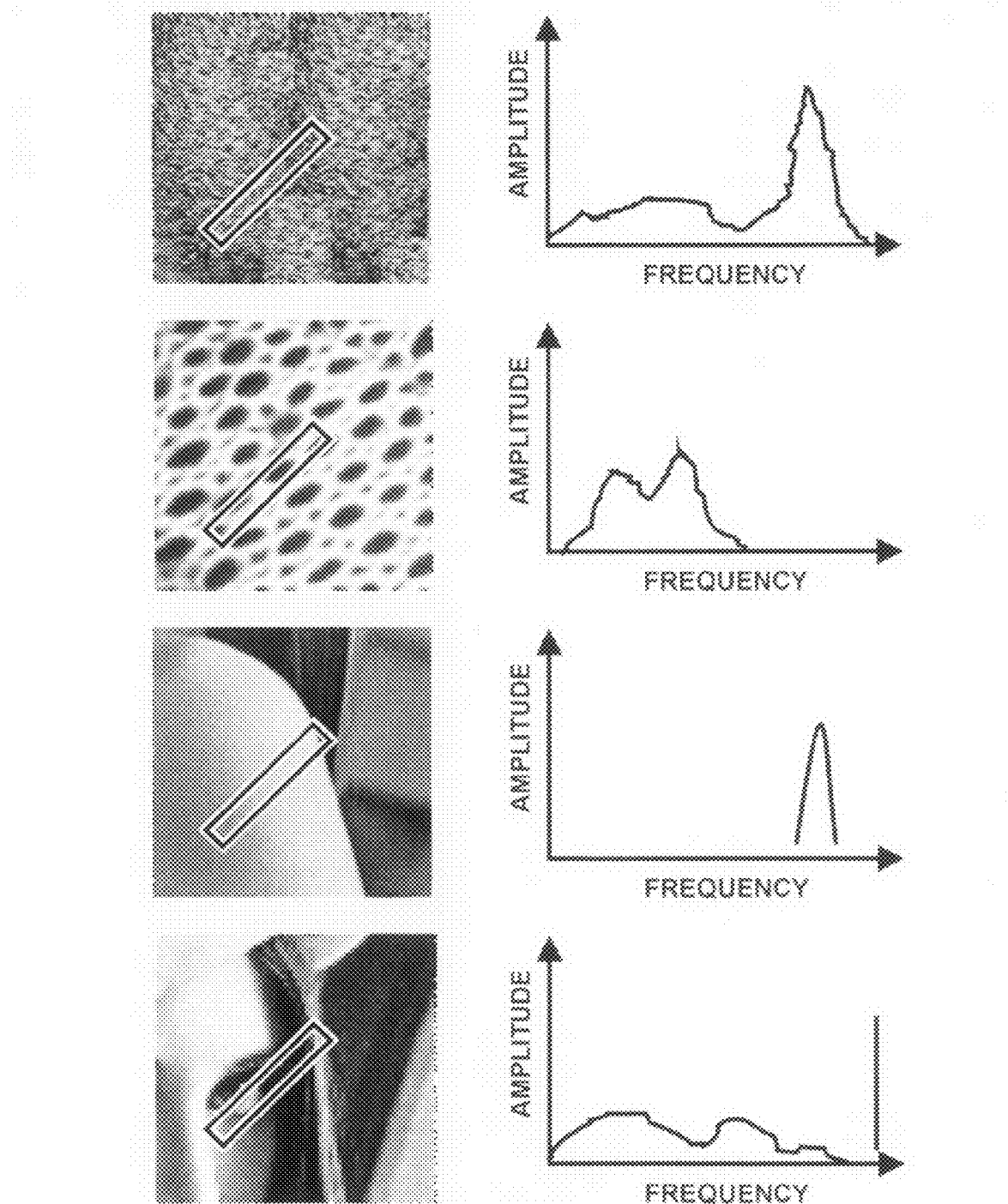
FIG. 8 illustrates a single orientation of oscillation along a path sampling aligned slices of different textures and features, and their resulting one-dimensional center/surround crossing spectra. Analogous to a phonograph needle sensing sound along a record groove, the proposed detector array oscillated along a line over a texture would render the luminance differences (interpretable as a "sound") whose frequency spectrum would be quite similar for similar regions of texture independent of the absolute brightness or contrast of the texture patch. In the phonograph analogy, increasing the volume does not change the instruments or the tune. Massively parallel real-time texture matching and texture region outlining are enabled in this manner.
Figure 9:
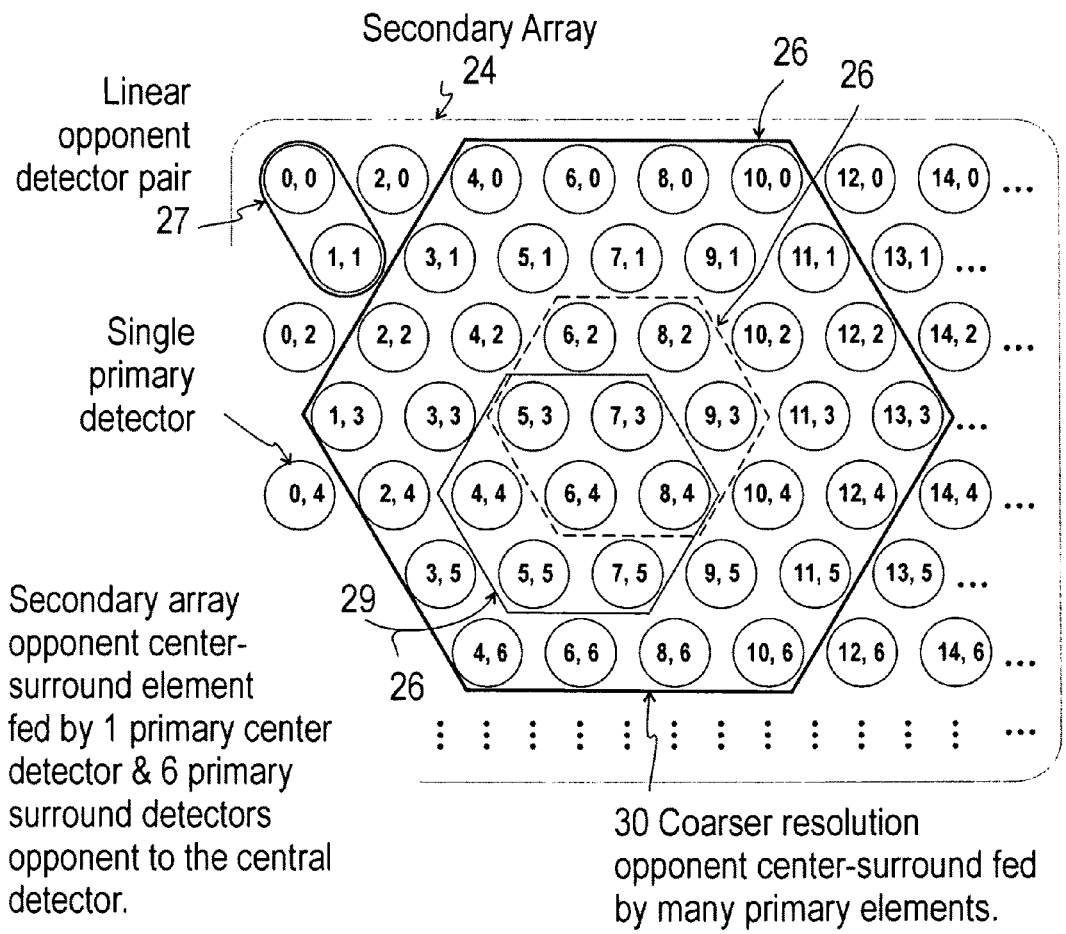
FIG. 9 illustrates a secondary array. The secondary array is comprised of either a two-dimensional array of multiple ON-center/OFF-surrounds, or a two-dimensional array of multiple ON-center/OFF-surrounds and another two-dimensional array of multiple OFF-center/ON-surrounds representing the same scene area captured by the primary array. Whether one or two different polarity opponent center/surrounds are employed depends upon the application. Any single secondary opponent center/surround of either polarity (26) is part of the entire secondary detector array (24), however all ON-Center/OFF-surrounds are members of the ON-Center/OFF-surround sub-array, and similarly all OFF-Center/On-surrounds are members of the OFF-Center/ON-surround sub-array if there is one. Primary detector elements mimicking mammalian cones in the primary detector array are staring integrators, where "staring" refers to the fact that each individual "cone" detector is always detecting and sending its integration to the secondary layer. Primary detectors can feed secondary centers directly behind them (to OFF- and/or to ON-centers), and can feed ON- and/or OFF surrounds directly behind them for adjacent secondary centers. A secondary opponent ON-center/OFF-surround sums one or more primary central detectors feeding its center and subtracts the sum of the primary detectors feeding the corresponding secondary surround (typically from 3 or more primary layer detectors surrounding the primary center detector (s)). Polarities are simply reversed for OFF-center/ON-surrounds. For classical hexagonally packed primary detectors each secondary opponent center/surround has one primary detector feeding its center and six surrounding primary detectors feeding its surround, such that every primary detector feeds a secondary center and six secondary surrounds, leading to overlapping secondary detectors in the secondary array. The structure and function of FIG. 9 can be read by the originally filed application.
Figure 10:
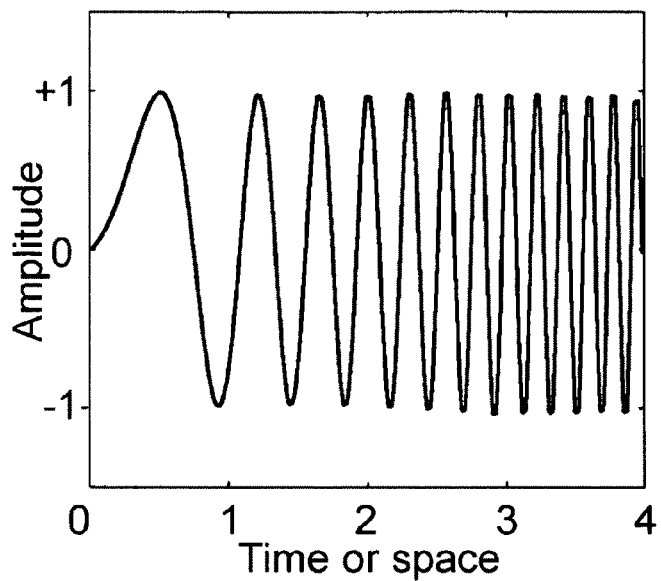
FIG. 10 shows two examples of one-dimensional sinusoidal chirps. The first chirp is linearly increasing in frequency with time, while the second chirp's frequency varies as the exponential of time. The spatial oscillation of the image upon the primary array performed to serve as a signature process can be a one- or two-dimensional spatial chirp, or any other oscillation suitable for improved separation of noise from the scene (e.g. oscillating perpendicular to a previously poorly detected edge).
Figure 10:
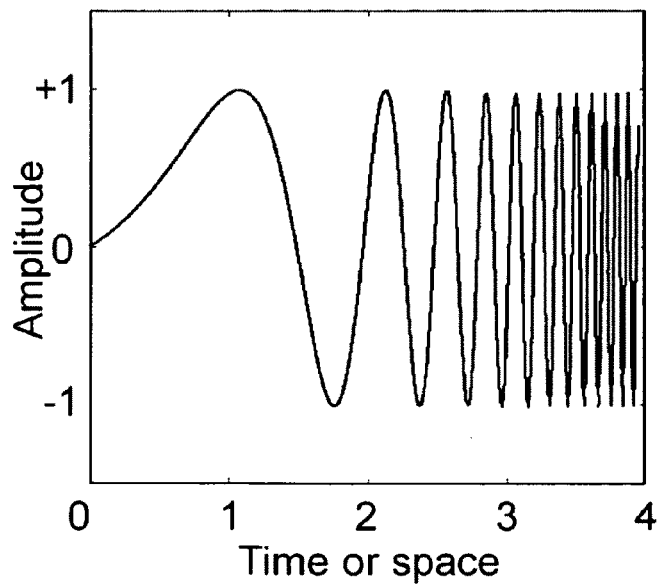
Figure 11:
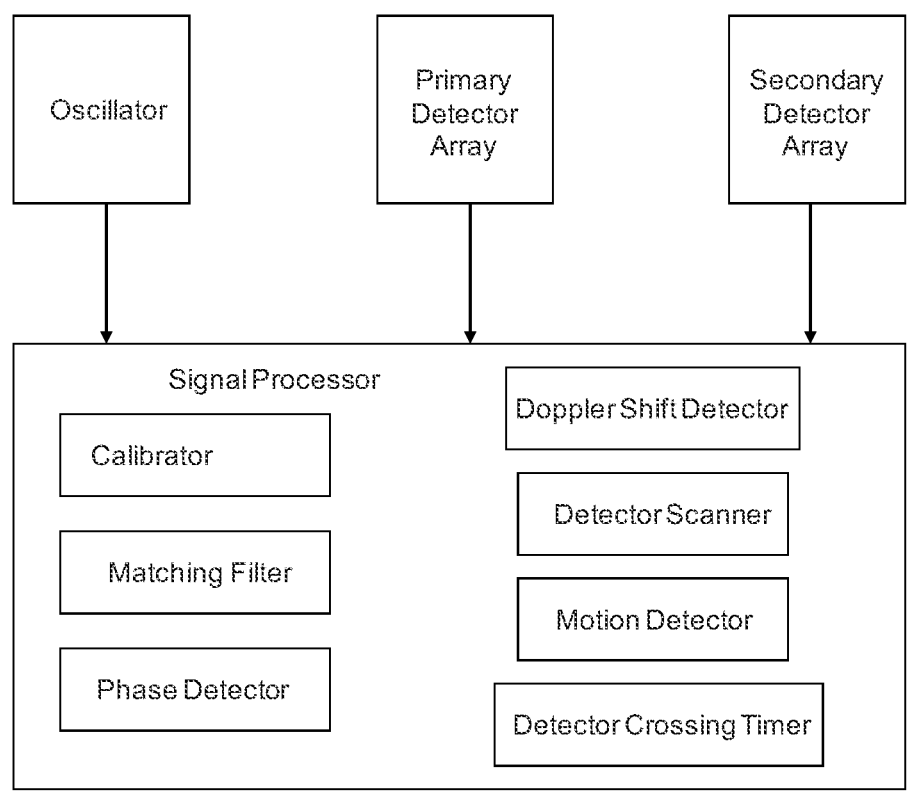
FIG. 11 is a block diagram illustrating the image processor components.

In human vision, it is believed that the spatial processing of texture occurs first at the retina, possibly to limit processing performed at the visual cortex, but that there is insufficient neural structure or bandwidth to handle the texture directly in the retinal image-space. Micro-saccades would serve this purpose by transforming the two-dimensional image structure into a few one-dimensional structures, such as neural pulse trains "mixed-down" to the lower frequencies that are handled by neurons. Texture can be differentiated from edges and isolated points given a particular size of center/surround region. As illustrated in FIG. 8, the oscillation of a texture in various directions will yield orientation-dependent noise spectra, while oscillating across a simple edge will provide a much narrower shaped band response dependent upon the orientation of oscillation, with an isolated point giving back a narrow spike for any orientation of oscillation.

In an embodiment of the present invention, a stereoscopic pair of these detector arrays can be utilized to provide information such as safe landing locations for pilots based upon texture and flatness analysis, as well as instantaneous trajectories for path prediction from accurate stereoscopic velocities. A stereoscopic pair can also prove useful for the navigation of systems such as robotic arms, vehicles, or aircraft in three dimensional space for interception/avoidance and capture tasks since the array will report every detector element crossing event in real-time with accurate positions and velocities. This is a capability not available in prior art raster-based vision systems (which cannot report pixel-to-pixel motions, and suffer from motion blur), such systems processing raster-scanned images and extracting inaccurate and delayed motion vector fields, since a delay of one video frame alone in any prior art real-time system makes navigation and interception of moving objects very difficult for anything but constant velocity or low velocity applications.

By intermittently adding a one-dimensional or a two-dimensional pre-determined spatial oscillation to the image or the detector array, real edge crossing events due to static edges in the image crossing these detectors (solely due to the relative oscillation) will possess the spatio-temporal motion signature of the induced oscillation. These events can be filtered for, since the oscillation path is known or can be accurately tracked.

This "threshold extension" technique used to reject detector noise, thereby increasing SNR, can be applied to radiology to permit a reduction in the dose of radiation required to produce an x-ray, and/or to bring diagnosable features up and out of the signal noise.

In an embodiment of the present invention, a spatially varying detection threshold based upon localized image content can be employed to suppress texture, control entropy, or match human vision characteristics. The detector does not employ raster scanning, but instead reports the exact timings and orientations of edge crossings from one opponent center/surround to the next. Therefore, its spatial and velocity-reporting accuracy are functions of its opponent center/surround temporal sensitivity, enabling the use of cheaper and larger pixels with fewer pixels per detector array. Since actual velocities are reported in real-time from the array's support logic, there is no need to calculate processor-intensive inaccurate motion-vector fields. In an embodiment of the present invention, the systematic cancellation of detector-difference during the oscillation of the array provides for the self-calibration of all adjacent detectors.

The invention utilizes the differential image provided by the center/surround structures to accurately determine position from the exact time of the crossing or phase of a contrast edge over such a detector. This can give high positional accuracy, fairly independent of the shape or size of the detectors/pixels themselves, enabling the use of large-area pixels with good light gathering capability with simultaneously high spatial resolution extracted from the time domain. The invention extracts a high-resolution image with a minimum of residual detector noise whether the image is optical, acoustic, composed of radio waves, x-rays, or any other medium, along with texture, motion and velocity information, all directly from a detector array and its supporting logic.

The invention obtains a high-resolution, de-noised image directly from a lower-resolution detector by removing spatio-temporal detector noise and pixel-to-pixel differences due to differences in detector responses, while analyzing sub-pixel resolution motions. As well, the invention greatly reduces downstream computational load for intelligent vision applications by isolating moving objects while removing noise, and since this is applied at the detector level, in the absence of any active transmission or illumination it can be purely passive, and therefore stealthy.

Although the present invention has been described in considerable detail with reference to certain preferred embodiments thereof, other versions are possible. Therefore, the scope of the appended claims should not be limited to the description of the preferred embodiments contained herein.

In an embodiment of the present invention each edge-crossing event at a specific opponent center/surround may be stored in spatial memory local to that center as time, amplitude, direction and location, to be row/column scanned and passed to a processing unit or processing array in near-real time.

I claim:

1. An imaging system comprising:
   a primary detector array having a plurality of detector elements sensitive to an input image so as to produce an image signal;
   an oscillator coupled to the primary detector for inducing a spatial oscillation in the input image relative to the primary detector array, whereby the image signal possesses a spatio-temporal motion signature of the induced oscillation;
   a secondary array of opponent center/surround detectors, each center/surround detector fed by one or more detectors from the primary detector array so as to extract improved contrast and motion information;
   an image processor including a calibrator coupled to each detector in the primary detector array with respect to neighboring one or more detectors in the primary and secondary detector arrays for using the image signal during the oscillation for calibrating said each detector; and
   wherein the oscillator is configured to provide one or more motionless periods in which no oscillation is induced, the system including a timer for direct timing of detector crossings during the motionless period for extracting one of real-time object velocity information and position information of elements crossing secondary array detector boundaries.

2. The imaging system according to claim 1, wherein the spatial oscillation is provided by a swept-frequency sinusoid chirp.

3. The imaging system according to claim 1, wherein a central detector in said secondary opponent center/surround detectors is configured to receive a signal input from one of the detector elements in the primary detector array, and wherein the surround detector of that central detector in said opponent center/surround detector is configured to receive a signal input of opposite polarity from one of the detector elements in the primary detector array adjacent to the primary center detector element for that secondary opponent center/surround detector.

4. The imaging system according to claim 1, wherein the image processor includes a phase detector for extracting phase information of scene elements crossing secondary array detector boundaries to provide at least one of increased spatial and motion accuracy.

5. The imaging system according to claim 1, wherein the image processor includes a Doppler shift detector for detecting Doppler shifts of opponent detector crossing frequencies for extracting real-time velocity information of elements crossing secondary array detector boundaries during the induced oscillation.

6. The imaging system according to claim 1, comprising means for performing a first coarse scan of the image, and subsequently a finer optimized analysis of the image at edges detected by the first coarse scan to provide improved imaging efficiency.

7. The imaging system according to claim 1, wherein the image processor includes a filter configured for extracting real-time, systematic detector-to-detector sensitivity variation information to provide relative calibration of the primary and secondary detector array elements.

8. The imaging system according to claim 1, wherein during oscillations of the image upon the detector the image processor is configured to suppress output of those of the detector elements not reporting real motions of image components within a scene.

9. The imaging system according to claim 1, wherein during oscillations of the image upon the detector the image processor is configured to increase sensitivity near those of the detector elements reporting real motions within a scene selectively in the orientations of those motions.

10. The imaging system according to claim 1, wherein the image processor includes a motion detector for extracting information pertaining to various motion spectra sampled at various orientations and/or scales, of different textures exposed to the detector array, derived from the relative motions on each orientation, of the textures upon the detector array.

11. The imaging system according to claim 1, wherein the image processor is configured to control at least one of a sensitivity and an integration time of at least one of the detector elements for extending a dynamic range of the detector array.

12. The imaging system according to claim 1, wherein the calibrator is configured to cancel output differences between adjacent ones of the detector elements during the induced oscillation thereby calibrating the array.

13. The imaging system according to claim 1, wherein the image processor is configured for chaining the detector arrays in groups separately chained in different orientations to provide a multi-resolution structure.

14. The image processor according to claim 1, wherein sufficient object integration while preventing object saturation allows re-integration of the secondary array's contrast image resulting in a new image having arbitrary bit depth and dynamic range, without information loss due to saturated high values or dropped-out low values suitable for companding.

15. A vision system utilizing spatial oscillation, the system comprising:
   a primary detector array having detector elements sensitive to an input image so as to produce an image signal;
   means for inducing a spatial oscillation in the image relative to the primary detector array, whereby the image signal possesses a spatio-temporal motion signature of the induced oscillation;
   a secondary array of opponent center/surround detectors, each center/surround detector fed by one or more detectors from the primary detector array so as to extract improved contrast information;
   an illuminator for providing a reference illumination spot aimed at the primary detector for calibrating each detector in the primary detector array with respect to neighbouring ones of the detectors in the primary detector array using the image signal during the oscillation; and
   a filter for filtering the image signal according to the spatio-temporal motion signature of the induced oscillation so as to extract those elements whose motions reflect the induced oscillation, therein removing noise events to provide enhanced image processing;

wherein the means for inducing spatial oscillation has motionless periods in which no oscillation is induced, the system including a timer for direct timing of detector crossings during the motionless periods for extracting real-time velocity information of elements crossing secondary array detector boundaries during the induced oscillation.

16. The system according to claim 15, wherein the induced oscillation is provided by a swept-frequency sinusoid chirp.

17. The system according to claim 15, including means for extracting phase information of elements crossing secondary array detector boundaries to provide increased spatial accuracy not available from primary detector size alone.

18. The system according to claim 15, including a Doppler shift detector for detecting Doppler shifts of opponent detector crossing frequencies for extracting real-time velocity information of elements crossing secondary detector array boundaries during the induced oscillation.

19. The system according to claim 15, including means for chaining said detector arrays in groups separately chained in different orientations to provide a multi-resolution structure.

20. The system according to claim 19, further including means for performing a first coarse scan of the image, and subsequently a finer scan at edges detected by the first coarse scan to provide improved imaging efficiency.

21. The system according to claim 15, including means for extracting real-time, systematic detector-to-detector sensitivity variation information to provide relative calibration of the array detectors.

22. The system according to claim 21, wherein the extracted information is a measure of the local contrast and/or local velocity to provide for spatially adapting the sensitivity threshold of the primary detector array in real-time.

23. The system according to claim 15, including means for suppressing ones of the opponent detectors indicating the latest positions of static edges found during the induced oscillation.

24. The system according to claim 15, including means for extracting information pertaining to various spectra sampled at various orientations and/or scales, of different textures exposed to the detector array, derived from the relative motions in each orientation, of the textures upon the detector array.

25. The system according to claim 15, further including a reference illumination spot aimed at a sample point within the primary detector array to measure the induced oscillation.

26. An imaging system comprising:
a primary detector array having a plurality of detector elements sensitive to an input image so as to produce an image signal;
a secondary array of opponent center/surround detectors, each center/surround detector fed by one or more detectors from the primary detector array;
an oscillator coupled to the primary detector for inducing a spatial oscillation in the input image relative to the primary detector array, whereby the image signal possesses a spatio-temporal motion signature of the induced oscillation which may be an arbitrary velocity along a straight line upon the array;
an image processor coupled to each detector in the primary detector array and coupled to each corresponding detector in the secondary detector array, and in communication with the oscillator, for extracting accurate times of object crossings upon the primary array detector elements; and
a spatio-temporally matching filter implemented on the image processor, for synchronously capturing detector-element crossing events of objects with the corresponding detector-element values.

27. The imaging system according to claim 26, wherein the detector-element values are the un-calibrated outputs of the primary detectors, the calibrated outputs of the primary detectors, or both.

28. The imaging system according to claim 26, wherein the image processor extracts improved spatial resolution of scene elements, improved temporal resolution of scene objects, or both.

29. The imaging system according to claim 26, wherein the image processor extracts an image with reduced noise, or greater dynamic range, or both.

30. The imaging system according to claim 26, wherein the system enables primary array elements to be locally calibrated to their neighbors.

31. The imaging system according to claim 26, wherein the times of object crossings of the primary detector elements provide motion trajectories of the objects including path information of each object, wherein the path information is used to predict future paths for each object.

32. The imaging system according to claim 31, wherein each object's luminance is fed forward in spatial memory along the object's predicted path, permitting arbitrary object integration times for each object, accumulated across the detector elements crossed by the object's path.

33. The image processor according to claim 32, wherein sufficient object integration while preventing object saturation allows re-integration of the secondary array's contrast image resulting in a new image having arbitrary bit depth and dynamic range, without information loss due to saturated high values or dropped-out low values suitable for companding.

34. The imaging system according to claim 26, wherein the times of object crossings of the primary detector elements provide velocities of the objects including velocity information of each object, wherein the velocity information is used to predict future velocities for each object.

35. A vision system utilizing spatial oscillation, the system comprising:
a primary detector array having detector elements sensitive to an input image so as to produce an image signal;
means for inducing a spatial oscillation in the image relative to the primary detector array, whereby the image signal possesses a spatio-temporal motion signature of the induced oscillation;
a secondary array of opponent center/surround detectors, each center/surround detector fed by one or more detectors from the primary detector array so as to extract improved contrast information;
means for a reference illumination spot aimed at the primary detector for calibrating each detector in the primary detector array with respect to neighboring ones of the detectors in the primary detector array using the image signal during the oscillation, where the reference illumination spot is a luminance of an object edge in the scene; and
a filter for filtering the image signal according to the spatio-temporal motion signature of the induced oscillation so as to extract those elements whose motions reflect the induced oscillation, therein removing mis-calibrations of primary array elements with respect to their neighbors, to provide enhanced image processing.

* * * * *